April 27, 1965 C. W. HARRIS ET AL 3,180,206
LARGE FIELD, HIGH RESOLUTION RADIANT ENERGY DETECTION SYSTEM
Filed Aug. 9, 1960 4 Sheets-Sheet 1
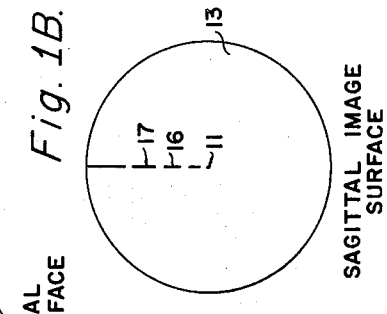
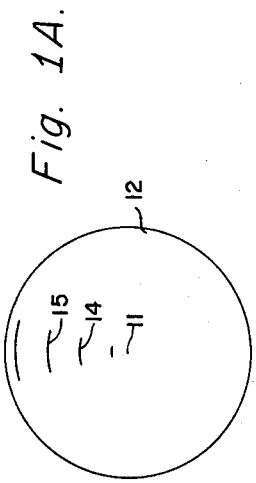
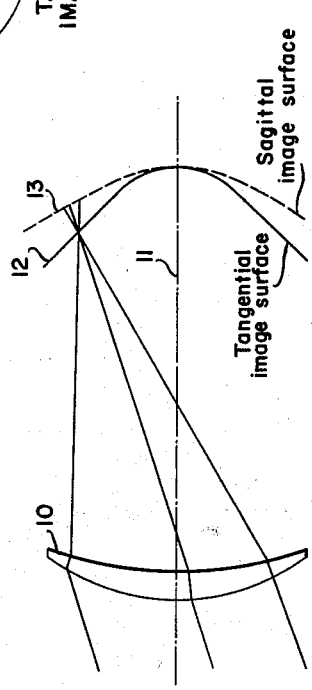
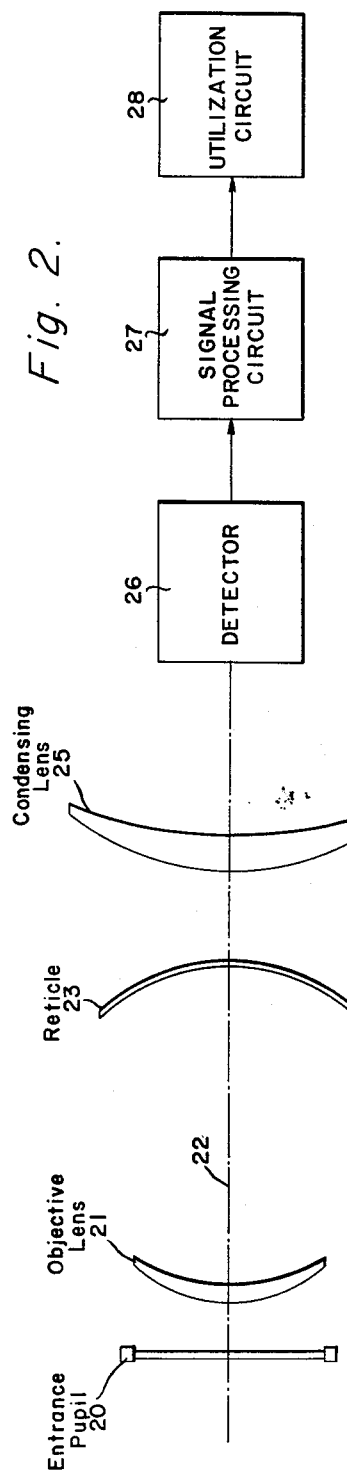
Clyde W. Harris,
Paul S. Sugino,
INVENTORS.
BY.
Noel B. Hammond
AGENT.

April 27, 1965 C. W. HARRIS ET AL 3,180,206
LARGE FIELD, HIGH RESOLUTION RADIANT ENERGY DETECTION SYSTEM
Filed Aug. 9, 1960 4 Sheets-Sheet 2

Clyde W. Harris,
Paul S. Sugino,
INVENTORS.

BY.

*Noel B. Hammond*

AGENT.

Clyde W. Harris,
Paul S. Sugino,
INVENTORS.
BY.

AGENT.

April 27, 1965   C. W. HARRIS ET AL   3,180,206
LARGE FIELD, HIGH RESOLUTION RADIANT ENERGY DETECTION SYSTEM
Filed Aug. 9, 1960   4 Sheets-Sheet 4

Clyde W. Harris,
Paul S. Sugino,
INVENTORS.
BY

Noel B. Hammond

AGENT.

United States Patent Office 3,180,206
Patented Apr. 27, 1965

3,180,206
LARGE FIELD, HIGH RESOLUTION RADIANT ENERGY DETECTION SYSTEM
Clyde W. Harris and Paul S. Sugino, Santa Barbara, Calif., assignors to Hughes Aircraft Company, Culver City, Calif., a corporation of Delaware
Filed Aug. 9, 1960, Ser. No. 48,407
10 Claims. (Cl. 88—1)

The present invention relates to apparatus for detecting the presence of radiant energy and, more particularly, to an opitcal detection system for detecting radiant energy such as that the infrared spectrum, the detection system having a wide field of view and providing high resolution yet utilizing a simple objective lens.

Heretofore, radiant energy detection systems have utilized an interruption reticle or episcotister having a flat interruption surface. Consequently, the objective lens has heretofore been corrected to provide good resolution and definition of object images over the flat reticle surface. It is well known in the lens art that it requires the highest degree of design and manufacturing skill to achieve high resolution over a flat image field for a moderately large field of view. Attempts to increase the effective aperture size of the objective lens without sacrificing the definition of the image or the area of the image field has resulted in objective lenses of complex construction uitlizing special types of lens materials. The size of the entrance pupil or aperture is a large factor in determining system sensitivity and thus should be as large as possible. A multiple lens must possess optical elements whose diameters are greater than the diameter of the entrance pupil, thus causing lenses for focusing a wide field of view to be extremely large and extremely expensive. Furthermore, complex lenses do not have high transparency because of the loss of transmitted energy through the large number of relatively thick lens elements.

It has heretofore been considered difficult to construct radiant energy detection systems having a wide field of view for the reasons discussed above. A field of view on the order of 15° has been considered to be an extremely large field of view and has necessitated the use of large, expensive complex lenses. Fields of view larger than approximately 15° have been considered impractical to attain in radiant energy detection systems.

Accordingly, it is an object of the present invention to provide radiant energy detecting apparatus that has a high resolution and wide field of view.

Another object of the invention is the provision of a radiant energy detector utilizing a simple objective lens of a size substantially identical to that of the entrance pupil and yet providing a wide field of view and high resolution.

In accordance with these and other objects of the invention, a simple converging objective lens of a size substantially equal to that of the entrance pupil focuses radiant energy admitted by the entrance pupil into a concave image surface. A transparent reticle is disposed at the image location and has a concave surface substantially conforming to the concave image surface. The concave surface of the reticle is provided with opaque areas forming an interruption pattern and apparatus is arranged to provide relative motion between the optical system and the reticle. In one embodiment of the device, the concave reticle surface conforms to the tangential image surface of the lens and the interruption pattern is in the form of a spiral. In a second embodiment of the invention, the concave reticle surface conforms to the sagittal image surface of the lens and the interruption pattern is in the form of radial spokes.

The following specification and the accompanying drawings respectively describe and illustrate exemplifications of the present invention. Consideration of the specification and the drawings will provide a complete understanding of the invention, including the novel features and objects thereof. Like reference characters are used to designate like parts throughout the figures of the drawings.

FIG. 1 is a diagram illustrating the image surfaces formed by a simple converging lens;

FIG. 1A is a diagram illustrating the shape of the images formed in the tangential image surface of the simple converging lens of FIG. 1;

FIG. 1B is a diagram illustrating the shape of the images formed in the sagittal image surface of the simple converging lens of FIG. 1;

FIG. 2 is a diagram illustrating an embodiment of a radiant energy detection system in accordance with the present invention;

Figure 3:
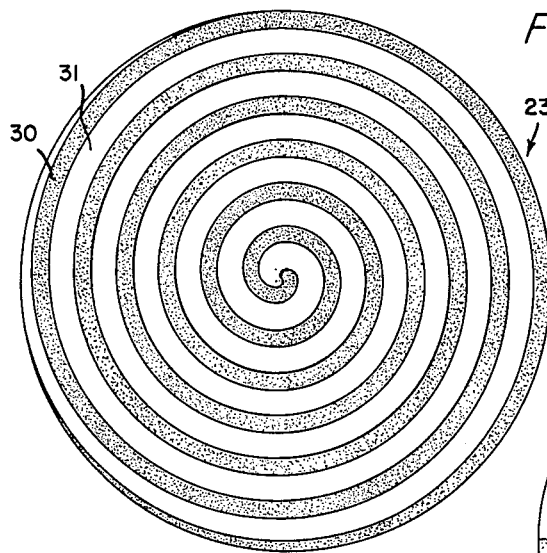
FIG. 3 illustrates an interruption pattern that may be used on the reticle of the radiant energy detection system of FIG. 2 for a tangential image surface.

The present invention is embodied in a radiant energy detection system, illustrated in FIG. 2, which includes an entrance pupil 20 that admits radiant energy to an objective lens 21. Intercepted radiant energy is focused by the lens 21 on an interruption reticle 23 that is rotated by rotation means 24. Radiant energy passing through the reticle 23 is concentrated by a condensing lens 25 on a radiant energy detector 26. An electrical signal produced by the detector 26 is applied to a signal processing circuit 27 where it is amplified and applied to a utilization circuit 28 for display.

The aperture 20 in the embodiment of the invention depicted in FIG. 2 is an opening in a member that may be one wall of a case enclosing the radiant energy detection system. However, the aperture 20 need not be a separate member inasmuch as the lens 21 only focuses energy passing through it and therefore serves as an aperture.

The objective lens 21 is, in the present example, a thin, concavo-convex element but may be any converging optical element. The lens 21 is disposed adjacent to the entrance aperture 20 and has an optical axis 22 extending through the center of the aperture 20. The objective lens 21 is substantially the same size as the entrance aperture 20 and has spherical surfaces. The objective lens 21 may be made of any material that is transparent to the radiant energy of interest and has a suitable index of refraction. For intercepted radiant energy in the infrared spectrum, the objective lens 21 may be made of sapphire, for example. Lenses for use in the infrared spectrum may be opaque to visible light. Although the present invention is described with reference to operation with radiant energy in the infrared portion of the radiant energy spectrum, it is to be expressly understood that the apparatus may be easily adapted for use with radiant energy in any part of the radiant energy spectrum as in the visible or ultraviolet portion, for example. This may be done by proper selection of the lens material and of the radiant energy detector 26, in accordance with well-known principles.

A simple lens characteristically transforms point sources of energy in the field of view into lines lying in two distinct concave image surfaces. The first is the primary or tangential image surface where the image lines are arcs centered on the optical axis of the lens whose lengths increase with distance from the axis. The second is the secondary or sagittal image surface where the images are lines radiating from the axis whose lengths also increase with distance from the axis. These image lines are normally quiet narrow, that is, sharply defined, out to large field angles.

In FIG. 1, a simple lens 10, which may be a single converging thin meniscus lens, as shown, or any other simple lens such as a doublet, focuses intercepted radiant energy into a primary or tangential image surface 12 and a secondary or sagittal image surface 13. Both of these image surfaces 12 and 13 are concave and form paraboloidal surfaces that cross the optical axis 11 of the lens 10 at the focal point. The tangential and sagittal image surfaces 12 and 13 are both concave toward the lens 10, the tangential image surface 12 curving closer to the lens 10.

Referring to FIGS. 1A and 1B, an object point on the optical axis 11 forms a sharply defined image point in both the tangential and sagittal image surfaces 12 and 13. However, an object point off the optical axis 11 forms, in the tangential image surface 12, a curved image line 14 (FIG. 1A) that is an arc of a circle concentric with the optical axis 11. The length of the curved image line 14 increases with the distance of the object point from the optical axis 11. Another object point farther from the optical axis 11 forms a longer curved image line 15 at a greater distance from the optical axis 11.

In the sagittal image surface 13, an object point off the axis 11 forms a straight radial image line 16 (FIG. 1B) extending radially outward from the optical axis 11. The length of the radial image line 16 increases with the distance that the object point is from the optical axis 11. A second object point farther from the optical axis 11 produces a longer radial image line 17 at a greater distance from the optical axis 11. Thus, an object point off the optical axis 11 of the simple lens 10 produces separate and distinct image lines in the tangential and sagittal image surfaces 12 and 13. Image lines formed in the tangential and sagittal image surfaces 12 and 13 are sharply defined but would be out of focus on a flat imaging screen passing through the focal point of the lens 10. Thus when viewed on a flat imaging surface, the out-of-focus image appears as a blurred image point corresponding to the object point. This property of a simple converging lens, namely, that of focusing the image into sharply defined lines in concave tangential and sagittal image surfaces is generally considered to be an impediment, but is utilized to advantage in the radiant energy detection system of the present invention.

A concave reticle 23 is disposed with its center on the optical axis 22 at the focal point of the objective lens 21. The reticle 23 is made of a material that is transparent to the radiant energy of interest and in this example, is curved to conform to the tangential image surface of the objective lens 21. The curvature of the tangential image surface of the objective lens 21 may either be calculated from the lens equations or may be determined by ray tracing, as is well known. It may sometimes be satisfactory if the reticle 23 has a spherical surface that only approximates the paraboloidal curvature of the tangential image surface. One of the concave surfaces of the reticle 23 is provided with opaque areas that form an interruption pattern, as will be described hereinafter.

The reticle 23 is rotatably mounted in the radiant energy detection apparatus for rotation around the optical axis 22 as an axis of rotation. Means 24, such as an electric motor geared to the reticle 23, is provided for rotation of the reticle 23. A condensing lens 25 is disposed adjacent the reticle 23 for concentrating radiant energy that passes through the reticle 23 onto a radiant energy detector 26 that is disposed on the optical axis 22. The field of view of the radiant energy detection system is made relatively large, 30 or 40 degrees, for example, by proper selection of the relative size of the aperture 20, size and focal length of the objective lens 21, size of the reticle 23, size and focal length of the condensing lens 25, and size of the detector 26.

The radiant energy detector 26 may be, for example, a lead sulfide cell. The output of the detector 26 is electrically connected to a signal processing circuit 27 that may be an A.C. amplifier but which may include other circuitry, if desired. The output of the signal processing circuit 27 is electrically connected to a utilization circuit 28, which may be an oscilloscope, for displaying signals developed by the radiant energy detection system.

As previously mentioned, the reticle 23 of the radiant energy detection system of FIG. 2 is curved to conform to the concave tangential image surface of the objective lens 21. One of the concave surfaces of the reticle 23 is provided with an opaque area 30 (FIG. 3) that extends from the center of the reticle 23 to the edge thereof in a spiral form. The spiral may be Archimedean, that is, a spiral defined by a point moving with uniform velocity in a stationary straight line across the reticle 23 while the reticle 23 rotates with a constant angular velocity.

The opaque area 30 may be applied to the reticle 23 by various methods. One process that has been found satisfactory is a photographic process in which the surface of the reticle 23 to which the spiral is to be applied is first silvered and then coated with a photo-resist material. An image of a spiral pattern is focused on the surface of the reticle 23, after which the reticle 23 is placed in an etchant bath where portions of the silvered area are etched away to leave the opaque area 30 (FIG. 3).

The opaque area 30 in the form of a spiral is intertwined with a transparent area 31 of the reticle 23; also in the form of a spiral. The width of the lines forming the opaque area 30 and the transparent area 31 is made to be approximately the size of the image of objects to be located. This will depend on the size of the objects, the distance of the objects, the magnification of the objective lens 21 and the resolution of the lens 21.

In operation, radiant energy is admitted to the radiant energy detection system through the entrance aperture 20 (FIG. 2). The admitted radiant energy is focused by the objective lens 21 on the tangential image surface of the reticle 23. The means 24 rotates the reticle 23 about the optical axis 22. Background energy, as from a bright sky or large objects such as clouds, is not interrupted by the reticle 23 because this radiant energy falls on a large area of the reticle 23. Consequently, a portion of the background radiant energy passes through the transparent area 31 at all times regardless of rotation of the reticle 23 and no periodic signal appears at the output of the detector 26 in response to the background radiant energy.

Objects to be located form a curved line image (FIG. 1A) on the reticle 23 having a width comparable to the width of the lines forming the opaque and transparent areas 30 and 31 of the interruption pattern. As the reticle 23 rotates, the curved line image is alternately on the opaque area 30 and the transparent area 31. Accordingly, the radiant energy from the object to be located is periodically interrupted. Only when the object is exactly on the optical axis 22 will periodic interruption fail to occur. If the spiral is Archimedean, the interruption period will be constant regardless of the position of the image on the surface of the reticle 23. The detector 26 produces a periodic signal in response to the radiant energy from the object to be located. The periodic signal is amplified in the signal processing circuit 27 and is applied to the utilization circuit 28 which indicates that an object of a size comparable to the opaque and transparent areas 30 and 31 of the interruption pattern is in the field of view of the radiant energy detection system.

Many modifications to the system may be made in accordance with the invention. The opaque area 30 on the reticle 23 may be a multiple spiral, that is, one having many arms. The spiral may be of a form other than Archimedean. The spiral may have different numbers of arms in different concentric zones of the reticle 23. This arrangement yields radial position information about the object to be located because the interruption period is different when the image is in different zones.

Figure 4:
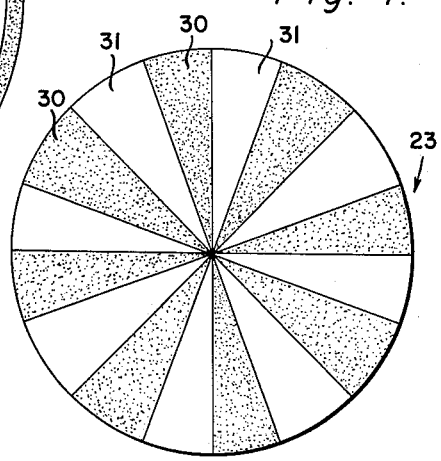
FIG. 4 illustrates an interruption pattern that may be used on the surface of the reticle of the radiant energy detecton system of FIG. 2 for a sagittal image surface.

If desired, the reticle 23 may be curved to conform to the sagittal image surface of the lens 21, rather than the tangential image surface. In this case, the images are radial lines as shown in FIG. 1B and the interruption pattern on the reticle 23 is a radial spoke pattern of sectors that are alternating opaque and transparent areas 30 and 31 (FIG. 4).

Figure 5:
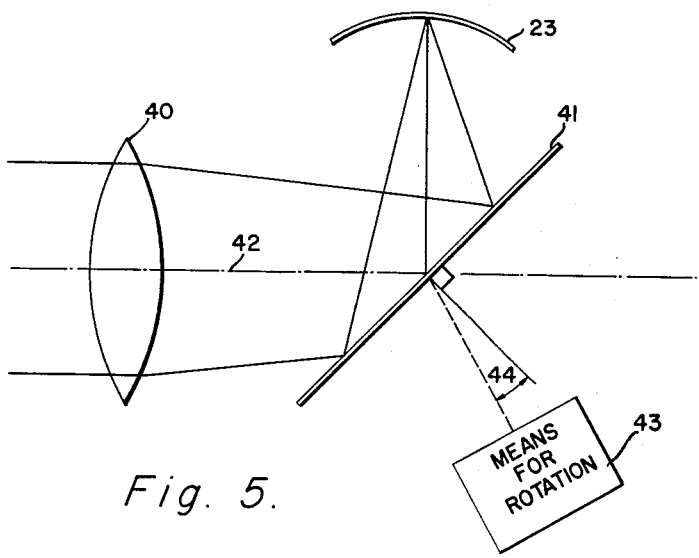
FIG. 5 illustrates an arrangement for nutating an image focused by a simple converging lens on a stationary reticle.

For some purposes it is desirable to have the reticle 23 stationary while the image of an object to be located is mover or nutated over the surface of the reticle 23 in a circular or other form of path. This may be accomplished as shown in FIG. 5, for example. An objective lens 40 focuses the intercepted radiation onto a mirror 41 disposed at an angle to the lens 40. The mirror 41 may be, for example, at an angle of 45° with respect to the lens 40 and the center point of the mirror 41 is on the optical axis 42 of the lens 40. The reticle 23 is disposed to receive the reflected energy from the mirror 41 and is curved to conform to the tangential or sagittal image surface. The reticle 23 is held stationary while the mirror 41 is movably mounted so that motion of the mirror 41 about its center point will cause the image of an object to move or nutate over the surface of the reticle 23. Means for rotation 43 is operatively coupled to the center of the mirror 41 at an angle 44 to a line perpendicular to the reflecting face thereof to move the mirror 41 about its center point.

Figure 6:
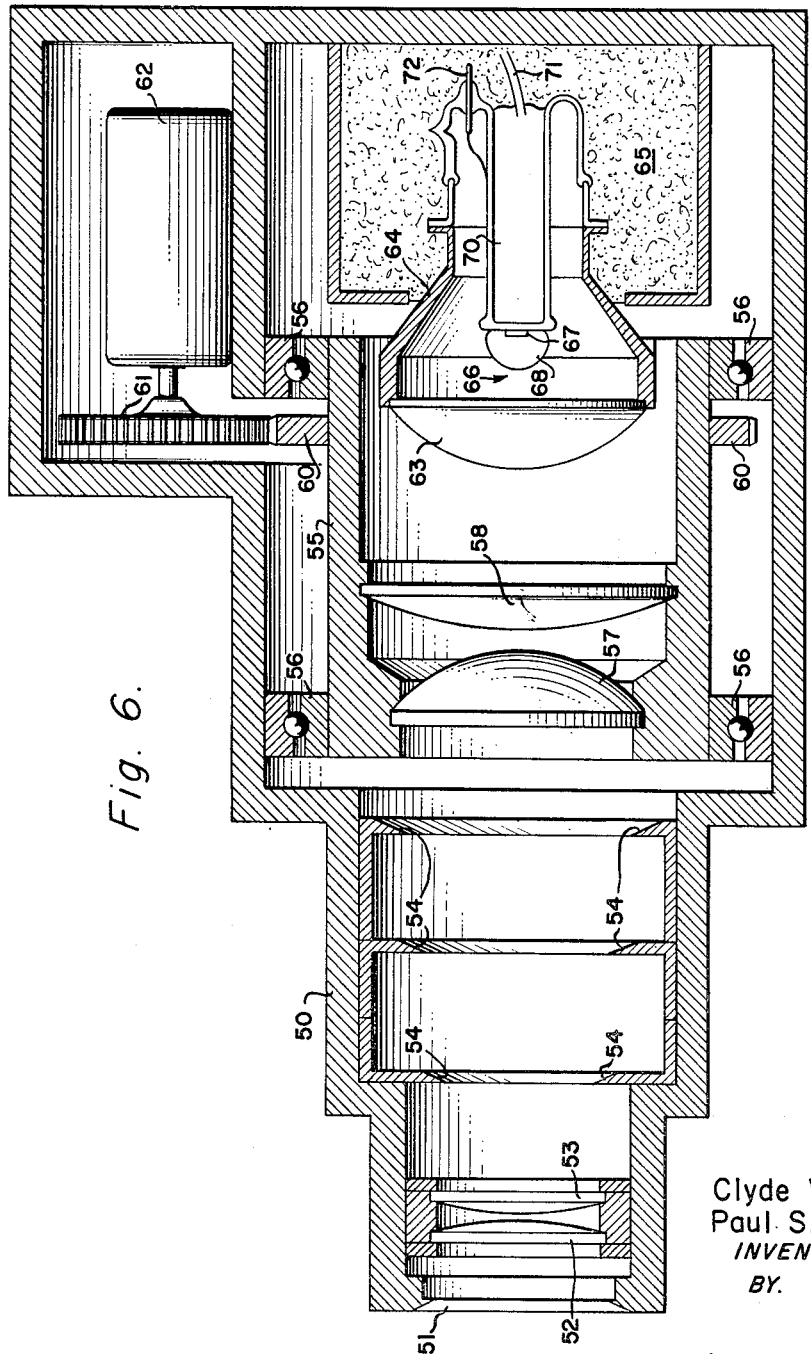
FIG. 6 illustrates a different embodiment of a radiant energy detection system in accordance with the invention.

FIG. 6 shows an embodiment of a radiant energy detection system in accordance with the invention that has been found to be satisfactory for detecting a flash of radiant energy in the infrared spectrum. This embodiment is compact and yet provides a wide field of view with high resolution of images. A case 50 which serves as a shield for the optical system is provided with an entrance aperture 51 adjacent to which is disposed two lenses 52 and 53, together forming a doublet. These objective lenses 52 and 53 are approximately the same size as the entrance aperture 51. Baffles 54 are provided inside the case 50 to prevent internal reflection of the radiant energy from the inner walls of the case 50. A cylindrical support 55 is rotatably mounted inside the case 50 concentric with the optical axis of the lenses 52, 53 by means of ball bearings 56. At the end of the cylindrical support 55 adjacent the lenses 52, 53, a reticle 57 is provided that is curved to conform to the tangential image surface of the lenses 52, 53.

A first condensing lens 58 is provided inside the support 55 adjacent the reticle 57. A ring gear 60 encircles the outside of the support 55 and engages a spur gear 61 driven by a motor 62. A second condensing lens 63 forms one end of a hermetically sealed housing 64. This housing 64 is embedded in a sealing compound 65 at the end of the case 50. The first and second condensing lenses 58 and 63 concentrate radiant energy passing through the reticle 57 onto a detector 66 disposed within the housing 64. The detector 66 is of the so-called immersion type and comprises a lead selenide cell 67 immersed in a strontium titanate or silicon immersion lens or button 68 having a high index of refraction, permitting use of a small cell 67. The detector 66 is mounted on the end of a glass chamber 70 extending into the housing 64. The inside of this chamber 70 is filled with a cold fluid such as liquid nitrogen, for example, by means of a tube 71 extending into the interior of the chamber 70 through the insulating compound 65. The interior of the housing 64 is sealed and evacuated and forms a Dewar flask. The electrical connections to the detector 66 are brought out of the housing 64 by means of metal pins 72 sealed in the glass forming the chamber 70.

Figure 7:
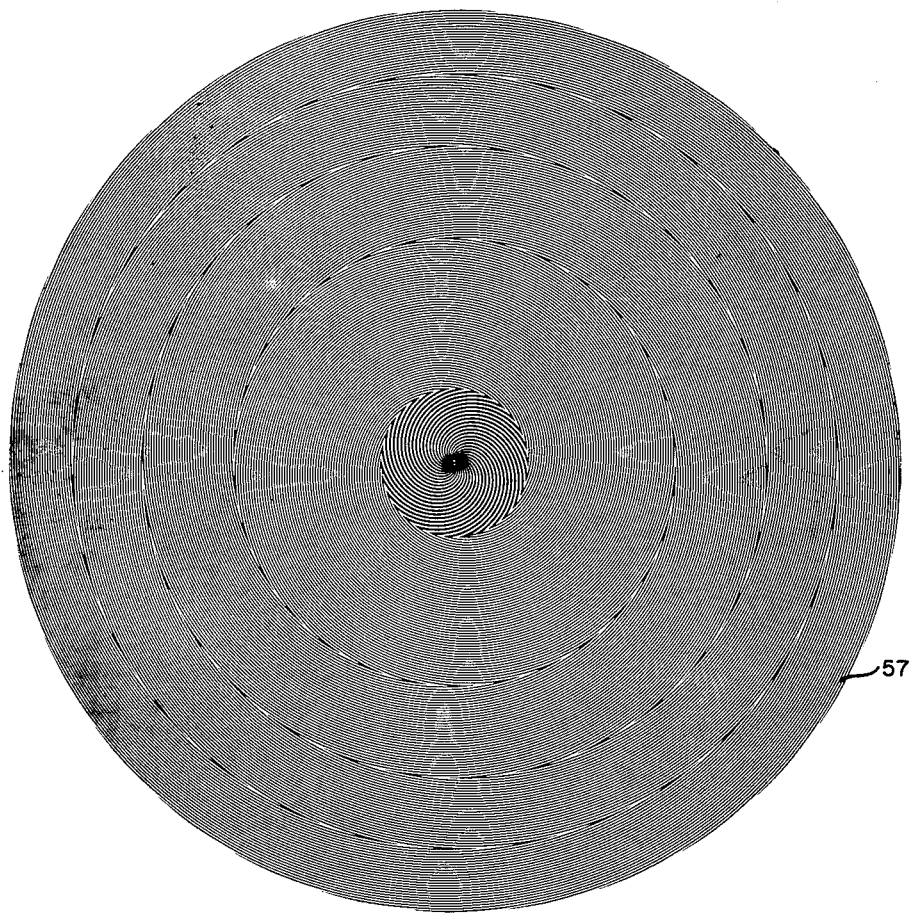
FIG. 7 illustrates a reticle pattern that may be used in the radiant energy detection system of FIG. 6 with a tangential image surface.

Referring to FIG. 7, the pattern on the reticle 57 is a spiral having many arms and having periodic reversals of direction. This spiral pattern is finely divided and is approximately three inches in diameter over all. The objective lenses 52 and 53 focus the image of an object to be located onto the reticle 57 with sufficient definition that it is interrupted by the pattern shown in FIG. 7. Other objects in the field of view of the radiant energy detection system larger than the object to be located produce an image on the reticle 57 that is too diffuse to be modulated by the pattern shown in FIG. 7. The reticle is rotated by means of the motor 62 driving the support 55 through the spur gear 61 and the ring gear 60.

Thus, there has been described a radiant energy detection system that is compact in size and utilizes a simple objective lens and yet provides high image resolution over a large field of view.

What is claimed is:

1. A radiant energy detection system comprising: an optical system having elements along an optical axis thereof including an objective lens providing astigmatically separated tangential and sagittal image surfaces, and a transparent reticle having a concave surface transverse to said optical axis and including opaque areas on which an image of a radiant energy source is focused, said concave reticle surface being positioned at and occupying one of said astigmatically separated image surfaces, said reticle being rotatably mounted, means operatively coupled to said reticle for providing periodic rotation of said reticle about said optical axis, and a radiant energy detector disposed to intercept radiant energy passing through said reticle.

2. A device for periodically interrupting radiant energy focused along an optical axis into astigmatically separated tangential and sagittal concave image surfaces by a converging objective lens, said device comprising: a reticle rotatably disposed at the image location and having a transparent concave surface transverse to the optical axis and substantially conforming to, positioned at and occupying one of said image surfaces, the concave surface of said reticle being provided with opaque areas defining a regular pattern; and means coupled to said reticle for rotating said reticle about said optical axis to cause periodic interruption of the focused radiant energy by the opaque areas on the surface of said reticle.

3. A device for periodically interrupting radiant energy focused along an optical axis into astigmatically separated concave tangential and sagittal image surfaces by a converging objective lens, said device comprising: a reticle rotatably disposed at the tangential image surface location and having a concave surface transverse to said optical axis and substantially conforming to, positioned at and occupying the tangential image surface, the concave surface of said reticle being provided with an opaque spiral pattern; and means coupled to said reticle for rotating said reticle about said optical axis to cause periodic interruption of the focused radiant energy by the opaque spiral pattern on the surface of said reticle.

4. A device for periodically interrupting radiant energy focused along an optical axis into astigmatically separated concave tangential and sagittal image surfaces by a converging objective lens, said device comprising: a reticle rotatably disposed at the sagittal image surface location and having a concave surface transverse to the optical axis and substantially conforming to, positioned at and occupying the sagittal image surface, the concave surface of said reticle being provided with an opaque radial spoke pattern; and means coupled to said reticle for rotating said reticle about said optical axis to cause periodic interruption of the focused radiant energy by the opaque radial spoke pattern on the surface of said reticle.

5. A device for detecting the presence of radiant energy comprising: means defining an entrance pupil having a large aperture for admitting radiant energy within the field of view of said pupil, a converging objective lens disposed adjacent said entrance pupil and being substantially the same size as said aperture for focusing the admitted radiant energy into astigmatically separated concave tangential and sagittal image surfaces, said objective lens having an optical axis; a transparent reticle rotatably disposed at the image location and having a concave surface transverse to said optical axis and substantially conforming to, positioned at and occupying one of the image surfaces, the concave surfaces of said reticle being provided with opaque areas defining a regular pattern; means coupled to said reticle for rotating said reticle about said optical axis to cause periodic interruption of the focused radiant energy by the opaque areas on the surface of said reticle; and a radiant energy detector disposed to intercept the interrupted radiant energy and produce an electrical signal in response thereto.

6. An optical radiant energy detector having a large field of view and high resolution comprising: means defining an entrance pupil for admitting radiant energy from a source within the field of view of the pupil; a converging objective lens disposed adjacent said entrance pupil and being substantially the same size as said entrance pupil for focusing the admitted radiant energy to form astigmatically separated concave tangential and sagittal image surfaces, off-axis object points forming elongated arc images in the tangential image surface, said objective lens having an optical axis; a rotatable reticle disposed at the tangential image surface location and having a concave surface transverse to said optical axis and substantially matching and occupying the tangential image surface, the concave surface of said reticle being provided with an opaque spiral pattern; means coupled to said reticle for rotating said reticle about said optical axis to cause periodic interruption of the focused radiant energy by the opaque spiral pattern on the surface of said reticle; and a radiant energy detector disposed to intercept the interrupted radiant energy and produce an electrical signal in response thereto.

7. An optical radiant energy detector having a large field of view and high resolution comprising: means defining an entrance pupil for admitting radiant energy from a source within the field of view of the pupil; an astigmatic objective lens disposed adjacent said entrance pupil and being substantially the same size as said entrance pupil for focusing the admitted radiant energy to form astigmatically separated curving tangential and sagittal image surfaces, off-axis object points forming elonagted radial images in the sagittal image surface, said objective lens having an optical axis; a rotatable reticle disposed at the sagittal image location and having a curved surface transverse to said optical axis and substantially matching and occupying the sagittal image surface, the curved surface of said reticle being provided with an opaque radial spoke pattern; means coupled to said reticle for rotating said reticle about said optical axis to cause periodic interruption of the focused radiant energy by the opaque radial spoke pattern on the surface of said reticle; a radiant energy detector disposed to intercept the interrupted radiant energy and produce an electrical signal in response thereto; a condensing lens disposed between said reticle and said radiant energy detector for concentrating the interrupted radiant energy on said detector; and a utilization circuit electrically coupled to said radiant energy detector.

8. An opical radiant energy detector having a large field of view and high resolution comprising: means defining an entrance pupil for admitting radiant energy from a source within the field of view of the pupil; an astigmatic objective lens disposed adjacent the entrance pupil and being substantially the same size as the entrance pupil for focusing the admitted radiant energy to form astigmatically separated curving tangential and sagittal image surfaces, off-axis object points forming elongated arc images in the tangential image surface, said objective lens having an optical axis; a rotatable reticle disposed at the tangential image location and having a curved surface transverse to said optical axis and substantially matching and occupying the tangential image surface, the curved surface of the reticle being provided with an opaque spiral pattern; means coupled to the reticle for rotating said reticle about said optical axis to cause periodic interruption of the focused radiant energy by the opaque spiral pattern on the surface of the reticle; a radiant energy detector disposed to intercept the interrupted radiant energy and produce an electrical signal in response thereto; a condensing lens disposed between the reticle and the radiant energy detector for concentrating the interruped radiant energy on the detector; and a utilization circuit electrically coupled to the radiant energy detector.

9. In a radiant energy detection system having astigmatic objective lens means for focusing radiant energy at astigmatically separated sagittal and tangential image surfaces of revolution along an optical axis, including a reticle, said reticle comprising: a member rotatably mounted in said system at a selected one of said image surfaces for rotation about an axis of said lens means, said member having a curved surface of revolution corresponding in curvature to said selected one of said image surfaces, and disposed in registry therewith transverse to said optical axis, said member having alternately opaque and transparent portions of a predetermined size and shape, whereby radiant energy focused on said member only passes through said transparent portions of said member, and whereby radiant energy forming an image on said member of a predetermined size and shape is periodically interrupted by rotation of said member about said optical axis.

10. A radiant energy detection system comprising: an optical system including an objective lens having an optical axis and providing astigmatically separated tangential and sagittal image surfaces, a mirror, and a stationary transparent reticle having a concave surface including opaque areas, the reflecting surface of said mirror being transverse to said optical axis at less than a right angle, said concave reticle surface being positioned to intercept radiant energy from said objective lens reflected from said mirror and occupying one of said astigmatically separated image surfaces, said mirror being rotatably mounted, means operatively coupled to said mirror for providing periodic rotation of said mirror about an axis displaced from the normal to the reflecting surface of the mirror by a predetermined angle to cause nutation of images on said concave reticle surface, and a radiant energy detector disposed to intercept radiant energy passing through said reticle.

References Cited by the Examiner
UNITED STATES PATENTS

| | | | |
|---|---|---|---|
| 2,016,780 | 10/35 | Hartinger | 88—1 |
| 2,725,781 | 12/55 | Banker | 88—1 |
| 2,758,502 | 8/56 | Scott et al. | 88—14 |
| 2,931,912 | 4/60 | Macleish | 88—1 |
| 2,957,384 | 10/60 | Raninen | 88—1 |
| 2,981,843 | 4/61 | Hansen | 250—203 |

JEWELL H. PEDERSEN, *Primary Examiner.*

EMIL G. ANDERSON, *Examiner.*